United States Patent Office
3,728,286
Patented Apr. 17, 1973

3,728,286
PYRAZOLANTHRONE ELECTRON EXCHANGERS
Reiner Welters and Dieter Randau, Darmstadt, Germany, assignors to Merck Patent Gesellschaft mit beschrankter Haftung, Darmstadt, Germany
No Drawing. Filed May 19, 1971, Ser. No. 145,003
Claims priority, application Germany, May 19, 1970, P 20 24 268.6
Int. Cl. C08f 19/20, 19/00
U.S. Cl. 260—2.2 R                22 Claims

ABSTRACT OF THE DISCLOSURE

Improved water insoluble, water swellable redox polymers having a substantially inert hydrophilic polymeric portion and an electron exchanging redox portion covalently bonded thereto wherein the redox portion is an N-bonded pyrazolanthrone group.

BACKGROUND OF THE INVENTION

Redox polymers are polymers which contain intact redox systems incorporated therein. Such polymers exhibit the capability of reversibly exchanging electrons with the surrounding phase and, in most cases, also ions via their hydrophilic groups. Although insoluble in conventional redox reaction mediums, e.g., water, they are hydrophilic and thus expandable therein to a limited extent. They thus are especially suitable for exchange reactions. The redox component is conventionally fixed to the polymer in a covalent manner.

A wide variety of materials have been employed as components of such redox systems. The best-known are the quinone/hydroquinone redox systems. See Cassidy et al., J. Am. Chem. Soc., 75, 1610, 1615 (1953); Manecke, Angew. Chem. 71, 646 (1959); and Soloway and Schwartz, Science, 121, 73 (1955). However, other reducing and/or oxidizing compounds have also been employed for this purpose, e.g., anthraquinones and pyrazoloquinones and thiols. See Gregor et al., J. Am. Chem. Soc., 77, 3675 (1955).

The known redox exchangers are not completely satisfactory. They normally exhibit insufficient physical and/or chemical resistance and, in most cases, very rapidly lose their redox capacity. Moreover, pyrazoloquinone based exchangers have the disadvantage that they cannot be produced, by copolymerization, in the form of bead polymers, which is by far the preferred form. Pyrazoloquinone monomers, e.g., 3-vinyl-pyrazoloquinone, are not adequately soluble in the organic solvents employed in suspension polymerization.

It is therefore an object of this invention to provide novel electron exchanger redox polymers having good physical and chemical resistance. It is another object to provide such polymers in the form of bead polymers. It is another object to provide such polymers whose redox capacity is retained through a plurality of redox cycles. Other objects will be apparent to those skilled in the art to which this invention pertains.

SUMMARY OF THE INVENTION

According to this invention, novel water insoluble, water swellable redox polymers having a substantially inert hydrophilic polymeric portion and an electron exchanging redox portion covalently bonded thereto comprising a pyrazolanthrone group, are produced by copolymerizing a pyrazolanthrone monomer and a monomer copolymerizable therewith or by a polymer-modification reaction in which a pyrazolanthrone is reacted with a polymer bearing a group reactive therewith.

In its composition aspect, this invention relates to novel eelctron exchanger redox polymers. In its use aspect, this invention relates to a method of conducting redox reactions employing the novel polymers of this invention. This invention also relates to processes for the preparation of redox polymers having pyrazolanthrone groups incorporated in the polymer as the electron-exchanging groups, by copolymerization or by reaction of a pyrazolanthrone with a polymer whose polymer units bear a group reactive therewith.

DETAILED DISCUSSION

The polymers of this invention have a substantially inert polymeric portion and an electron exchanging redox portion covalently bonded thereto. They are characterized by the presence in the polymer chain of polymer units bearing as a substituent a pyrazolanthrone group. They have regenerable redox capacity. They are water insoluble and vary in physical structure from gels to granular solids, which normally are porous beads. They are water swellable, i.e., they contain sufficient hydrophilic groups to counteract the hydrophobic character of the polymer portion of the molecule.

The redox potential of the polymers varies from about −100 to −160 millivolts, usually about −120 to −140. Their redox capacity varies usually proportionately to their pyrazolanthrone content, e.g., from about 0.1 to 1.2, usually about 0.2 to 0.4 milliequivalent.

When the polymers are granular, their particle diameter is about 0.125 to 0.1 mm., preferably about 0.25 to 0.63 mm., and their porosity is usually from about 100 to 1000 A.

The novel polymeric exchangers of this invention are distinguished by a high chemical stability. Even after 10 redox cycles, no substantial decrease in the redox capacity ordinarily is observed. Also, the mechanical strength of the novel polymers is excellent, especially when in the form of bead polymers. A further advantage of the novel polymeric electron exchangers is the intense color change they display when changing from the reduced to the oxidized form, i.e., the reduced form is usually green and the oxidized form is usually light yelow. This clearly visible color change can be used advantageously for indicating the degree of depletion of the resin. This color change is especially well-pronounced in the preferred copolymers of the present invention.

Chemically, the novel polymers of this invention can be characterized as hydrophilized redox polymers which bear pyrazolanthrone groups as the electron-exchanging groups. By hydrophilized is meant the polymer contains a group on the polymer chain which renders the polymer hydrophilic.

In a preferred embodiment, a pyrazolanthrone group is attached by a nitrogen atom thereof directly or via an alkylene bridge, preferably methylene, or ethylene, to a carbon atom of a polymer unit of the polymer.

Preferred among these polymers are those of the formula

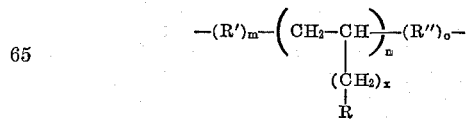

wherein R is the pyrazolanthrone group attached by the 1- or 2-position nitrogen atom; R' is a polymer unit of a comonomer as defined hereinafter, e.g.,

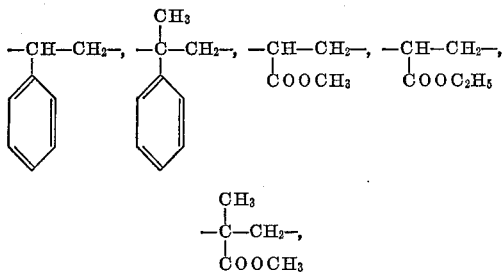

R" is a cross-linking polymer unit of a difunctional monomer as defined hereinafter, e.g.,

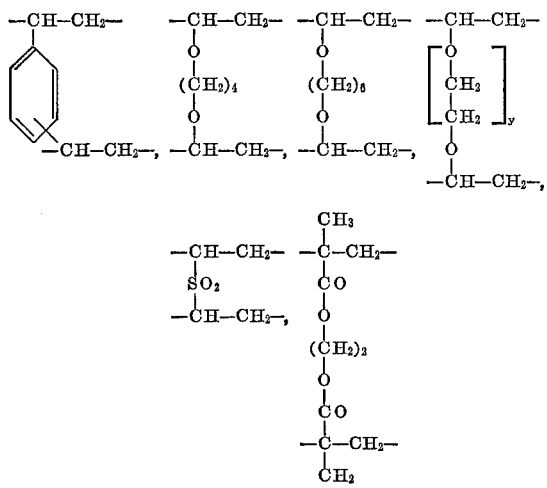

wherein y is 1 to 40;
x is 0 or 1, m is 0.4 to 0.96, preferably 0.4 to 0.5,
n is 0.02 to 0.2, preferably 0.05 to 0.1, o is 0.02 to 0.4, preferably 0.2 to 0.4, wherein $m+n+o=1$.

In addition to a group derived from pyrazolanthrone itself, which has the formula

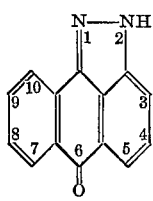

the redox group can also be supplied by a substituted pyrazolanthrone. Any pyrazolanthrone group which has redox capacity can be employed. Thus, the pyrozolanthrone nucleus can bear one or more, preferably 1–5, simple, non-interfering groups at the 3, 4, 5, 7, 8, 9 and/or 10 positions, e.g., halo, preferably chloro or bromo, nitro, lower-alkyl (1–4 carbon atoms), preferably methyl or ethyl, sulfato, amino, lower-alkylamino, preferably methylamino or ethylamino, di-lower-alkylamino, preferably dimethylamino or diethylamino, carboxy, and the like.

Due to the fact that the starting materials are readily accessible, the following substituted pyrazolanthrones are especially suitable; 10 - chloro-; 5 - nitro-; 5 - amino-; 4-methyl-5-nitro; 4-methyl-5-amino-; 7-nitro-; 7-amino-; 4-bromo-5-amino-; 4-SO$_3$H-5-amino-; and 4,7,9 - tribromo - 5,10 - diaminopyrazolanthrone and the corresponding amino-substituted pyrazolanthrones wherein the amino groups are substituted, preferably with lower-alkyl of 1–4-carbon atoms to form mono- and dialkylamino groups, e.g., methylamino and dimethylamino. All of these substituted pyrazolanthrones can be produced in a conventional manner by reacting the correspondingly substituted 1-halo-anthraquinones with hydrazine.

The novel polymeric electron exchangers of this invention can be produced in a conventional manner. The redox component can either be a member of the polymer chain, i.e., incorporated in the chain by polymerization, or bound to the polymer as a substituent.

The preparation of the polymers can be conducted by methods customary in polymer chemistry, e.g., by the polymerization of corresponding monomers or by a polymer-modification reaction. The thus-obtained products are usually then hydrophilized by the introduction of an ion-exchanging group, e.g., by the introduction of sulfonic acid groups and/or carboxyl groups.

When preparing the electron exchangers of this invention by polymerization, a polymerizable monomer is used as the starting substance, e.g., a monomer derived from a pyrazolanthrone. Preferred monomers are those pyrazolanthrones which contain as a substituent a vinyl group on one of the nitrogen atoms in the 1- and 2-position, especially N - alkenyl - pyrazolanthrones wherein the alkenyl group contains 2–4 carbon atoms. Most easily produced of such monomers are, for example, N-vinyl-, N-allyl, N-metallyl-, and N-isopropenyl-pyrazolanthrone and the corresponding ring substituted pyrazolanthrones. N-allyl-pyrazolanthrone has been disclosed in the literature.

Other N-alkenylpyrazolanthrones can be produced in a conventional manner. Thus, pyrazolanthrone or a substituted pyrazolanthrone can be reacted with an alkenyl halogenide, preferably the chloride, in the presence of an alkaline agent in a polar solvent. They can also be formed from the corresponding N-unsubstituted pyrazolanthrones by conventional mercury acetate catalyzed transvinylation with, for example, vinyl acetate.

These N-alkenyl-pyrazolanthrone monomers are then copolymerized in a conventional manner with another olefinically unsaturated monomer and a conventional cross-linking agent. The type and amount of the respective monomer and the cross-linking agent are dependent on the desired properties of the polymer to be produced. Since the polymers are essentially only carriers for the pyrazolanthrone redox groups, they can be varied over very wide limits. Preferred comonomers include the vinylbenzenes, e.g., styrene and α-methylstyrene and the α-ethylenically unsaturated esters, e.g., methacrylates and acrylates, wherein the ester groups can contain 1–20 carbon atoms, preferably 1 to 8 carbon atoms. The most economical ester monomers are the lower-alkyl, i.e., containing 1–4 carbon atoms, esters, particularly methyl, ethyl and butyl methacrylate.

As alternatives to styrene, ring substituted vinyl benzenes, e.g., vinyltoluene and/or vinylnaphthalene, can also be employed. In place of the acrylate and methacrylate esters, the corresponding amides and/or nitriles can be employed. Thus, a great variety of mixed polymers is also possible.

Any cross-linking agent conventionally employed to produce cross-linked polymers can be employed to produce the polymeric portion of the polymers of this invention. Preferred are those having two or more end-positioned vinyl groups, e.g., vinyl and allyl ethers of dihydric to hexahydric alcohols, which optionally can be only partially etherified, e.g., alkanedioldivinyl- and diallyl ethers, wherein the alkanediol group contains 2 to 12, preferably 2 to 6 carbon atoms, e.g., divinyl or diallyl ethers of ethylene glycol, propylene glycol, butanediol, hexanediol, the di- and trivinyl-, diallyl and triallyl ethers of glycerol, the divinyl and diallyl ethers of sorbitol, pentaerythritol, di- and triethylene glycol and polyethylene glycols and polypropylene glycols and the trivinyl and triallyl ethers of polypropyleneoxide triol. Others include α,ω-divinyl alkylenes containing up to 20 carbon atoms, e.g., 1,5-hexadiene, 1,9-decadiene and 2-chlorobutadiene. Also suitable are compounds wherein the vinyl groups are linked by hetero atoms or hetero groups, e.g., by Si or $SO_2$, including diallyldimethyl silane, methyltrialkyl silane and other allyl, lower-alkyl silanes, tetraallyl silane, and divinyl and diallyl sulfone, bis-α-ethylenically unsaturated amides, e.g., N,N'-lower-alkylenediacrylamides, including N,N-methylenediacrylamide and N,N'-methylenedimethacrylamide, and bis-α-ethylenically unsaturated esters, including lower-alkylene glycol diacrylates, e.g., ethylene glycol di(meth)acrylate, and other compounds containing two or more activated ethylenic double bonds, e.g., allyl acrylate, divinyl ketone, or divinyl sulfide. Because they are readily available, divinyl benzene and butanediol- and hexanediol divinyl ethers are especially advantageous. On the whole, the exact character of the cross-linking agent does not play an important part because, as is known, the cross-linking agents merely serve the purpose of varying the porosity of the polymers.

The polymerization is conducted in a conventional manner, preferably as a suspension polymerization, and most preferably with the formation of bead, i.e., granular, polymers. In this process, 40–96 mol percent of the olefinically unsaturated monomer, e.g., styrene, is copolymerized with 2–40 mol percent of the cross-linking agent and 2–20 mol percent of the pyrazolanthrone monomer.

In a suspension polymerization, the ratio of organic to aqueous phase during the suspension polymerization is preferably about 1:1 to 1:5.

Preferred polymers of this invention are copolymers wherein 2–20 mol percent thereof are pyrazolanthrone polymer units bonded by the 1- or 2-position nitrogen atom thereof directly or via a methylene group to a carbon atom in the polymer chain.

As the aqueous phase for the polymerization, a solution of NaCl in water is preferably employed, e.g., with an NaCl content up to 15% by weight. Water-insoluble organic solvents are employed as the organic phase, e.g., benzene, toluene, xylene, butyl acetate, naphtha gasoline (solvent naphtha), octane, or a mixture of these solvents, preferably a mixture of toluene and naphtha gasoline, or butyl acetate and naphtha gasoline. Butyl acetate and mixtures thereof are not conventionally employed as the organic phase in such polymerization processes. However, surprisingly, this solvent yields particularly advantageous results in the polymerization of this invention. The content of the individual solvents can each vary between about 5 and 95% by volume. As is known, the porosity of the resins can be adjusted by varying the solvent proportions during the polymerization. Changing the proportions of the solvents can result in the production of polymers having a gel structure, which is normally porous, or a macroporous structure. In the present process, i.e., using a mixture of butyl acetate and naphtha gasoline, gel structures are obtained when using an excess of butyl acetate, e.g., 6:1, whereas an excess of naphtha gasoline, e.g., 5:1, yields macroporous resins. All types of transitional forms can be obtained by the use of various ratios of solvent mixtures.

Normally, the polymerization is free radical initiated, using as initiators the usual radical-forming agents, especially the peroxides and azo compounds. Initiator concentrations normally range between 0.01 and 10 mol percent, preferably between 0.1 and 2.5 mol percent, based on the volume of the organic phase. Due to their ready availability, preferred radical-forming agents are azoisobutyrodinitrile, benzoyl peroxide, di-tert.-butyl peroxide, and dilauroyl peroxide.

It is advantageous to conduct the polymerization in the presence of a protective colloid. For such purpose the customary compounds are employed, for example, polyvinyl alcohol and polyvinylpyrrolidone, in a concentration of preferably 0.03–3% by weight, based on the total volume of the charge. Other conventional protective colloids can also be employed.

The bead-like redox resin obtained by suspension copolymerization can, if the olefinic monomers do not contain any nitrogen other than that present in the pyrazolanthrone group, be characterized by the nitrogen content, which content represents a measure of the redox group content of the polymer. Normally, polymers are obtained having a nitrogen content of 0.4–4.5% by weight, preferably about 0.4 to 2% by weight. Since the pyrazolanthrone group has a molecular weight of 219, based on this nitrogen content, the pyrazolanthrone groups represent about 3 to 35, preferably about 4 to 16, percent by weight of the polymer.

The granular size of the bead polymers of this invention preferably is between about 0.125 and 1, preferably between about 0.25 and 0.63 mm. (particle diameter).

The novel polymeric electron exchangers of this invention can also be produced by a polymer-modification reaction, i.e., a polymer having the desired porosity and grain size whose polymer units have a substituent reactive with a pyrazolanthrone for linking the redox component thereto. Examples of polymers especially suited for this purpose are halomethylated polymers which can be reacted in a simple manner with pyrazolanthrones or salts thereof. In this connection, the above-mentioned polymers of olefinic unsaturated monomers which are cross-linked with substances containing divinyl groups are preferably employed. Preferred divinyl compounds are also those described above, particularly divinylbenzene. The content of cross-linking agent is dependent on the desired structure of the polymers and generally ranges between about 2 and 40 mol percent. The porosity of the polymers can be adjusted in a conventional manner by the polymerization conditions. Suitable polymers are available commercially. They also can be produced in a conventional manner.

In order to attach the redox group of this invention to these polymers, the polymers must possess a reactive group which can form a covalent bond with the polymer and the selected pyrazolanthrone or the salt thereof. If such groups are not already present in the polymer from the starting monomers, they can be introduced subsequently into the polymer. For this purpose, numerous methods are known. The most customary one is the halomethylation, particularly for the introduction of chloromethyl groups. However, bromomethyl groups or hydrolysis products thereof, e.g., hydroxymethyl, can be introduced in this maner. In chloromethylation, for example, the reaction conditions are suitably selected so that the final product contains 1–20, preferably 2–15% chlorine. The chloromethylation is most advantageously effected by treatment with chlorodimethyl ether and zinc chloride.

Another possibility is to conduct a linking reaction with the aid of halogen atoms, which method can be utilized, for example, by the use of iodated styrene as the monomer or acrylates bearing a substitutable halogen atom, e.g., β-chloroethyl acrylate.

The desired polymer with the pyrazolanthrone-reactive groups is then reacted with a pyrazolanthrone or a salt thereof. Preferred solvents are dimethylformamide and/or dimethyl sulfoxide. An alkaline agent, e.g., anhydrous potassium or sodium carbonate, sodium, sodium ethylate, sodium hydride, sodium amide, sodium or potassium hydroxide, is preferably also employed. The reaction is usually conducted at temperatures of between 50 and 150° C. The reaction times normally vary between 0.5 and 5 hours.

In addition to the preferred sodium salts of the selected pyrazolanthrone, it is also possible to employ other salts of strong inorganic bases, especially alkali and alkaline earth salts, e.g., K, Li, Ca, Ba, Mg.

During these polymer-modification reactions, in each instance products are only obtained which have a specific proportion of the redox component. The proportion of pyrazolanthrone groups in the final polymer also depends on the content of reactive groups, e.g., chloromethyl groups, in the starting polymer. In the case of a polystyrene cross-linked with divinylbenzene having a chlorine content of 5–20% by weight, redox polymers of this invention are obtained, for example, with a nitrogen content of 0.5–6.5% by weight. Up to 80% of the theoretically possible redox groups, calculated on the reactive groups in the polymer, can be attached to the polymer.

The resins produced by copolymerization, as well as those prepared by polymer-modification reaction, are then thoroughly purified. This is most simply done by repeated suspension and decanting in suitable washing fluids which can remove residues of the initially employed reactants. Normally, aqueous washing fluids are utilized toward the end of the procedure. In many cases, it is advantageous to provide an extraction step as the last purification stage, which extraction is conducted until the extraction liquid drains off as a colorless fluid.

Prior to being employed as redox exchangers, the thus-obtained polymers ordinarily must be hydrophilized, which can be done most suitably in a conventional manner by the introduction of sulfonic acid groups. The most customary procedure to do so is the reaction of the redox polymer with chlorosulfonic acid in an inert solvent, e.g., dichloroethane, methylene chloride or carbon tetrachloride. However, other sulfonation reactions are likewise possible, e.g., employing sulfuric acid, sulfur trioxide, or propanesulfone. The thus-produced ion exchange capacity is defined by the sulfur content of the exchangers. The thus-hydrophilized redox polymers of this invention have a sulfur content of between about 5 and 12% by weight.

Hydrophilization can also be conducted in various other ways. Thus, it is possible, for example, to introduce carboxyl groups, for example by reaction with chloroacetic acid ester or bromoacetic acid ester in a Friedel-Crafts reaction followed by hydrolysis of the ester group. When monomers are employed which produce polymers bearing groups which can be converted to carboxyl groups, for example by saponification, e.g., methacrylates or methacrylonitriles, the hydrophilization can also be effected by partial or total saponification of such groups.

According to another conventional mode of operation, a portion of the halo or halomethyl groups present in the resin can be reacted with trimethylamine or an equivalent base to produce an amino substituted redox polymer. The only important factor is that the polymers lose their hydrophobic character and become swellable in water.

The various electron exchangers of this invention differ in their redox capacity. The resins obtained by copolymerization generally have redox capacities of 0.3–1.2 milligram equivalents/gram, whereas the corresponding capacities of the products obtained by a polymer-modification reaction usually are 0.1–0.3 milligram equivalent/gram. The redox capacities of the resins are determined as follows:

Five grams of the dry redox exchanger is expanded in water and then left for one hour with occasional inverting of the reaction vessel in 100 ml. of a 5% alkaline sodium dithionite solution. The exchanger is thus converted into its reduced form. Care must be taken that the reduced exchanger does not come into contact with oxygen or oxygen-containing solutions prior to use. The exchanger is then washed neutral with water in a column. Then, 50 ml. of 1 N sulfuric acid and, over a period of one hour, 50 ml. of 0.1-molar ammonium iron (III) sulfate in 1 N sulfuric acid are allowed to pass through the column. The capacity of the redox exchanger in milligram equivalents/gram is calculated from the content of iron(III) ions in the eluate, e.g., as determined by manganometry.

The novel products are distinguished by the above-mentioned advantageous properties enabling the use of these products in a great variety of applications. Thus, due to their strongly negative potential ($\approx -130$ millivolts) the products are especially suitable for conducting reduction reactions, especially inorganic compounds. They also can be employed for the removal of atmospheric oxygen from gases and liquids, as well as the removal of peroxides from solvents. Redox resins in the reduced form can be employed, for example, for the deposition of metals of for ion charge reversals. The polymers can likewise be employed in organic chemistry, primarily as reducing agents, since they contain a very negative redox potential. Other fields of application are in biochemistry and pharmaceutical chemistry. For example, anaerobic conditions can be created in bacteriology. During the storage of oxygen-sensitive pharmaceuticals, the redox resins in their reduced form can be used for protection against oxidation.

The electron exchangers of this invention are usable in a particularly advantageous manner in columns, since they are preferably in the form of bead polymers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the redox capacity is given as mv./g. (mval./g.) meaning milliequivalents/gram.

EXAMPLE 1

(a) 23 g. of allyl chloride is dissolved in 500 ml. of dimethylformamide. In this solution is suspended 50 g. of pyrazolanthrone. The suspension is mixed with 31.6 g. of anhydrous potassium carbonate and heated to 100° C. under agitation. After 90 minutes, the reaction mixture is filtered off and the filtrate is poured into 1.5 l. of ice water. The thus-precipitated brown-green sediment is filtered, washed with 1 l. of ice water, and stirred with 200 ml. of ice cold isopropanol. Thereafter, the reaction mixture is washed twice with 200 ml. portions of cold isopropanol and then filtered. The thus-obtained crude product is dissolved for purification purposes under heating in 250 ml. of acetone. The solution is poured into 500 ml. of water under agitation. This purification step is optionally repeated. After filtering, washing with cold isopropanol, and drying, light-yellow crystals are obtained having the melting point of 139–141° C. Yield in N-allyl-pyrazolanthrone: 42.2 g.=71.2% of theory.

(b) In a four-necked flask with agitator, reflux condenser, and gas feed pipe, 2.5 g. of polyvinylpyrrolidone is dissolved, under agitation, in 200 ml. of 10% NaCl solution. Then, 60 ml. of n-butyl acetate, 12.6 g. of styrene, 15.8 g. of divinylbenzene (about 60% strength), and 5.25 g. of N-allyl-pyrazolanthrone are added thereto. The mixture is then mixed, under further agitation, with 3 g. of azoisobutyrodinitrile and 60 ml. of solvent naphtha.

While passing nitrogen over the reaction mixture, the latter is heated as rapidly as possible to produce slight reflux and agitated at the boiling temperature for 6 hours. Thereafter, the mixture is stirred for another 3 hours without heating. The thus-obtained suspension is poured into 1 l. of methanol and stirred for 30 minutes. The beads are allowed to settle and the upper phase is decanted. The beads are suspended three times in 500 ml. portions of methanol and then decanted. This purification step is repeated up to five times with 500 ml. portions of a mixture of methanol and water in a ratio of 2:1. Thereafter, the beads are extracted with acetone until the extraction liquid is discharged as a colorless fluid. Yellow beads (15.7 g.) are obtained with a nitrogen content of 1.3%. The thus-produced redox resin is of normal porosity.

(c) 46.7 g. of the normally porous redox resin obtained according to Example 1(b) is agitated for 15 minutes with 386 ml. of dichloroethane. Under ice cooling and agitation, 164 g. of chlorosulfonic acid is added thereto dropwise in such a manner that the internal temperature remains constant at 15° C. After 16 hours of agitation at room temperature, the beads are filtered and introduced, under stirring into 1 l. of ice water.

The aqueous suspension is heated on a water bath until the residual dichloroethane has been evaporated. The beads are washed with water until the excess liquid exhibits a neutral reaction. Subsequently, the beads are extracted with tetrahydrofuran until the extraction liquid discharged is colorless. After drying, 66.1 g. of the sulfonated redox exchanger is obtained. After screening, 56.6 g. thereof possess the desired granular size of between 0.25 and 0.63 mm. The nitrogen content of the resin is 0.7%, the sulfur content is 11.5%. The redox potential is approximately —130 millivolts; the redox capacity is 0.7–0.6 mv./g.

EXAMPLE 2

(a) 54 g. of pyrazolanthrone and 300 ml. of dimethylformamide are introduced into a 3-liter three-necked flask equipped with an agitator and a reflux condenser. The reaction mixture is heated under agitation to about 100° C. until a clear, red solution has been produced. The mixture is then allowed to cool under stirring to 60–70° C., and 30 ml. of an approximately 20% strength sodium hydride dispersion in paraffin oil is gradually added thereto. The reaction mixture is converted into a foam due to the thus-initiated hydrogen evolution. After termination of the foam formation, 50 g. of a chloromethylated, macroporous polystyrene (produced by the chloromethylation of "Lewatite" (Bayer), chlorine content 17.4%, granular size 0.125–0.250 mm.) is added thereto and the suspension is agitated for 4½ hours at 100° C. Then, the reaction suspension is filtered in the hot state, and the residue is washed four times with respectively 100 ml. of hot dimethylformamide. The remaining beads are suspended in 150 ml. of dioxane, stirred, and filtered. The washing step with dioxane is repeated three times. Thereafter, another series of washing steps are conducted eight times with respectively about 250 ml. of acetone. Then, the filtrate has thus been rendered clorless, and the beads can be dried in a drying chamber at 40° C., thus obtaining 87 g. of light-yellow beads having a nitrogen content of 5.9% (theory: 7.2%); from this nitrogen value, it can be seen that about every second (every 2.17th) styrene core is linked with a pyrazolanthrone residue via a methylene bridge.

(b) The sulfonation of these beads is conducted analogously to Example 1(c). The redox resin obtained by polymer-analogous reaction exhibits a redox potential of about —130 mvolt and a redox capacity of about 0.3–0.2 mv./g.

EXAMPLE 3

Four grams of mercury acetate is dissolved in 300 ml. of vinyl acetate with the addition of several drops of concentrated sulfuric acid. Into this solution, 20 g. of pyrazolanthrone is introduced, and the suspension is heated to the boiling point under reflux for one hour under a nitrogen atmosphere. After the addition of 5 g. of sodium acetate, the excess vinyl acetate is removed under reduced pressure. The residue is taken up in 200 ml. of chloroform, filtered off from insoluble inorganic products, and the filtrate is filtered over a silica gel column. The thus-produced chloroform solution is concentrated to 50 ml. and cooled to 0° C. After a certain period of time, N-vinyl-pyrazolanthrone precipitates as a finely pulverized, yellowish red product. Melting point: 150–153° C.; yield: 6.2 g.

The reaction to a normally porous redox resin is conducted in accordance with Example 1(b); the sulfonation is effected analogously to Example 1(c).

The thus-obtained normally porous redox resin exhibits a redox potential of about —130 mvolt; redox capacity is 0.6–0.5 mv./g.

EXAMPLE 4

Analogously to Example 1(b), 5 g. of polyvinylpyrrolidone, 400 ml. of a 10% strength NaCl solution, 60 ml. of n-butyl acetate, 25.2 g. of styrene, 31.6 g. of divinyl benzene (approximately 60% strength), and 10.5 g. of N-allyl-pyrazolanthrone, obtained in accordance with Example 1(a), are subjected to a bead polymerization process with 6 g. of azoisobutyrodinitrile and 180 ml. of solvent naphtha. The bead polymer is washed with 1.5 l. of isopropanol. Thereafter, the suspended substances produced during the polymerization are practically entirely removed by repeated stirring with 500 ml. portions of isopropanol/water (1:1). The thus-obtained beads are extracted with acetone until the extraction liquid discharged is colorless. In this manner, 46.7 g. of light-yellow, dull beads is obtained having a nitrogen content of 1.3%. Bead diameter: 0.25–1 mm.

This macroporous redox resin is sulfonated in accordance with Example 1(c), thus obtaining a product with a redox potential of about —130 mvolt; redox capacity: 0.8–0.7 mv./g.

A resin exhibiting approximately the same properties is also obtained when employing α-methylstyrene in place of styrene.

EXAMPLE 5

Analogously to Example 1(b), a normally porous redox resin is produced by copolymerization, but employing, in place of n-butyl acetate, 60 ml. of toluene.

A redox resin of normal porosity is obtained having a nitrogen content of 1.4%. The yield is 15.9 g. of light-yellow beads, average diameter 0.5 mm. The sulfonation is conducted analogously to Example 1(c). The thus-produced resin exhibits a redox potential of —130 mvolt.

EXAMPLE 6

(a) Analogously to Example 1(b), N-methallyl-pyrazolanthrone is prepared with the use of 27.2 g. of methallyl chloride in place of allyl chloride, thus obtaining 40.5 g. of yellow crystals having a melting point of 125–127° C. Yied: 40.5 g.

(b) Analogously to Example 4, a macroporous redox resin is produced by copolymerization, but wherein 11 g. of N-methallyl-pyrazolanthrone is employed in place of N-allyl-pyrazolanthrone. After conducting the working-up step as described above, 45 g. of light-yellow beads is obtained with a nitrogen content of 1.2%. Average diameter of the beads: 0.5 mm.

After conducting a sulfonation analogously to Example 1(c), a product is obtained having a redox potential of —130 mvolt; redox capacity: about 0.8 mv./g.

EXAMPLE 7

20 g. of the resin obtained in accordance with Example 4 is reduced in a column with sodium dithionite and washed. Then, 270 mg. of quinone is dissolved in a small amount of ethanol and introduced into the column. After eluting with ethanol/water (1:1), 229.8 mg. of hydroquinone is found in the eluate by potentiometry. This corresponds to a yield of 83.4%, based on the quinone initially employed. In addition thereto, 2.9 mg. of quinone (=1.07% of the quinone initially employed) was detected in the eluate.

Accordingly, a practically complete reduction was achieved by means of the resin of this invention.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A water insoluble, water swellable redox polymer having a substantially inert polymeric portion and an electron exchanging redox portion covalently bonded thereto wherein the redox portion is a pyrazolanthrone group attached by a nitrogen atom thereof to a carbon atom of the polymeric portion.

2. A polymer according to claim 1 wherein the polymer is a porous bead polymer.

3. A polymer according to claim 1 wherein in addition to the pyrazolanthrone group the polymeric portion bears a hydrophilic group.

4. A polymer according to claim 3 wherein the hydrophilic group is an ion exchange group.

5. A polymer according to claim 4 wherein the hydrophilic group is a sulfonic acid group.

6. A porous bead polymer according to claim 1 having, in addition to the pyrazolanthrone group, an ion exchange group.

7. A polymer according to claim 1 wherein the pyrazolanthrone groups constitute about 3 to 35 percent by weight of the polymer.

8. A polymer according to claim 1 wherein the pyrazolanthrone groups constitute about 4 to 16 percent by weight of the polymer.

9. A polymer according to claim 1 formed from 2–20 mol percent of a pyrazolanthrone containing an N-ethylenic group, 2–40 mol percent of a cross-linking divinyl compound and 40–96 mol percent of another olefinic monomer.

10. A polymer according to claim 9 formed from 40–96 mol percent of styrene and 2–20 mol percent of N-allyl-pyrazolanthrone or N-methallyl-pyrazolanthrone and cross-linked by 2–40 mol percent of divinylbenzene.

11. A bead polymer according to claim 1 having a particle diameter of about 0.125–1 mm.

12. A bead polymer according to claim 11 having a particle size of about 0.25–0.63 mm.

13. A bead polymer according to claim 11 having a redox capacity of about 0.1–1.2 milligram equivalents/gram.

14. A polymer according to claim 9 of one or more of styrene, α-methylstyrene, and an ester of methacrylic acid or acrylic acid containing up to 20 carbon atoms in the ester group.

15. A polymer according to claim 14 cross-linked with divinylbenzene.

16. A polymer according to claim 9 of N-allyl-, N-methallyl- or N-vinyl-pyrazolanthrone.

17. A process for the production of a polymer according to claim 2 which comprises conducting suspension polymerization of 2–20 mol percent of a pyrazolanthrone monomer containing an N-ethylenic group, 2–40 mol percent of a cross-linking divinyl compound and 40–96 mol percent of another olefinic monomer in a reaction solvent mixture wherein the water-insoluble organic phase comprises butyl acetate.

18. A process according to claim 17 wherein the water-insoluble organic phase consists essentially of n-butyl acetate and solvent naphtha in a ratio of about 6:1 to 1:5.

19. A process according to claim 18 wherein the reaction is conducted in the presence of at least one of dimethylformamide and dimethyl sulfoxide.

20. In a process comprising a redox reaction which employs as electron exchanger a water insoluble, water swellable polymer having a substantially inert polymeric portion and an electron exchanging redox portion covalently bonded thereto, the improvement which comprises employing as electron exchanger a polymer according to claim 1.

21. A process according to claim 20 wherein the polymer is a porous bead polymer.

22. A process according to claim 21 wherein the polymer is a copolymer of one or more of styrene, α-methylstyrene, an ester of methacrylic acid or acrylic acid containing up to 20 carbon atoms in the ester group and of N-allyl-, N-methallyl- or N-vinyl-pyrazolanthrone, cross-linked with divinylbenzene.

References Cited

UNITED STATES PATENTS

| | | | |
|---|---|---|---|
| 3,267,073 | 8/1966 | Kun | 260—47 |
| 3,278,487 | 10/1966 | Kun | 260—47 |

OTHER REFERENCES

Winnicky: Polimery 11(9), 416–18 (1966).

Manecke et al.: J. Polym. Sci. Part C, No. 22 (pt. 2), 957–63 (1967).

Mukhitdinova et al.: Izv. Akad. Nauk Kaz. SSSR, Ser. Khim. 20(2), 52–56 (1970).

Ergozhin et al.: Izv. Akad. Nauk SSSR, Ser. Khim. 1970(9), 2126–28.

MELVIN GOLDSTEIN, Primary Examiner

U.S. Cl. X.R.

260—2.1 E, 66, 80.72